(No Model.) 2 Sheets—Sheet 2.
J. GUARDIOLA.
EVAPORATING APPARATUS FOR SACCHARINE AND OTHER JUICES.
No. 341,843. Patented May 11, 1886.
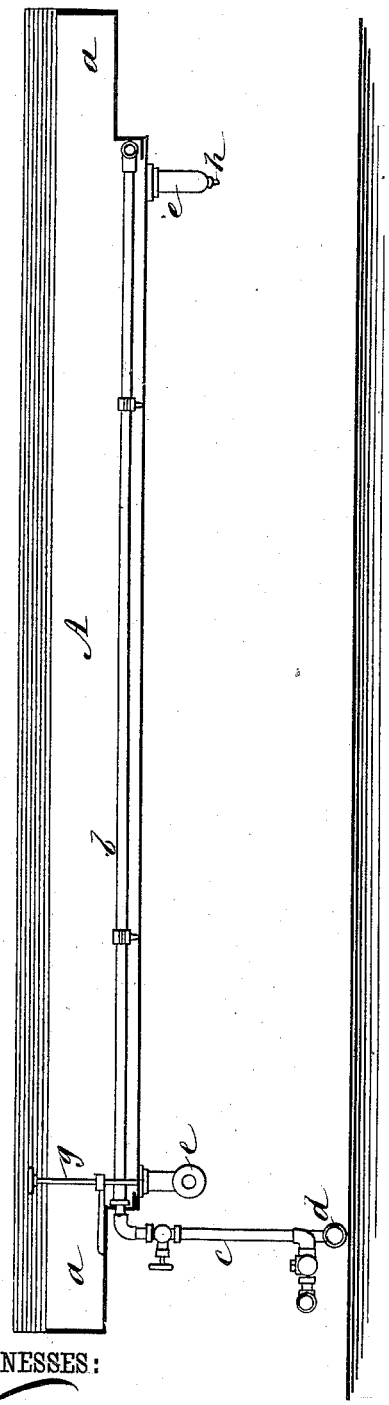
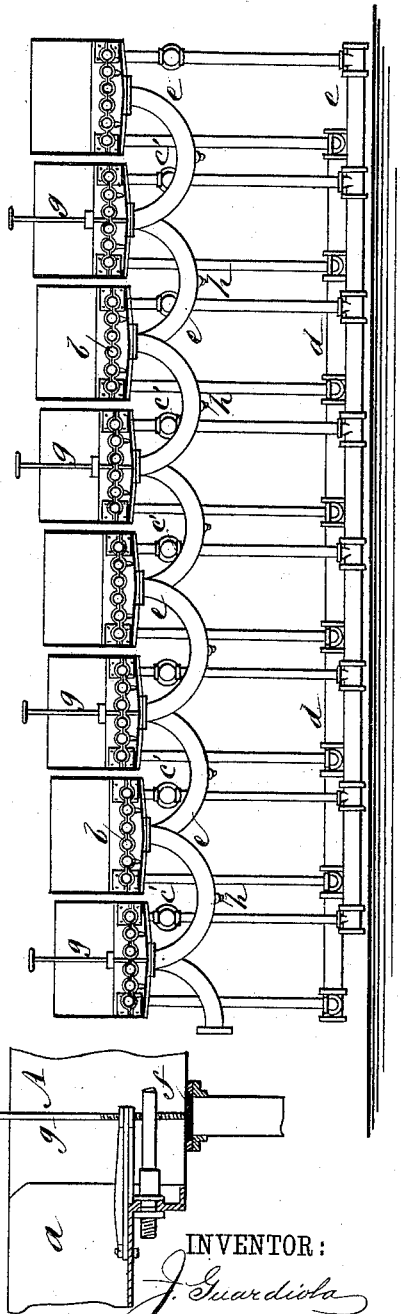
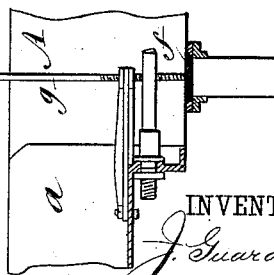
WITNESSES:
C. Neveux
C. Sedgwick
INVENTOR:
J. Guardiola
BY Munn & Co.
ATTORNEYS.

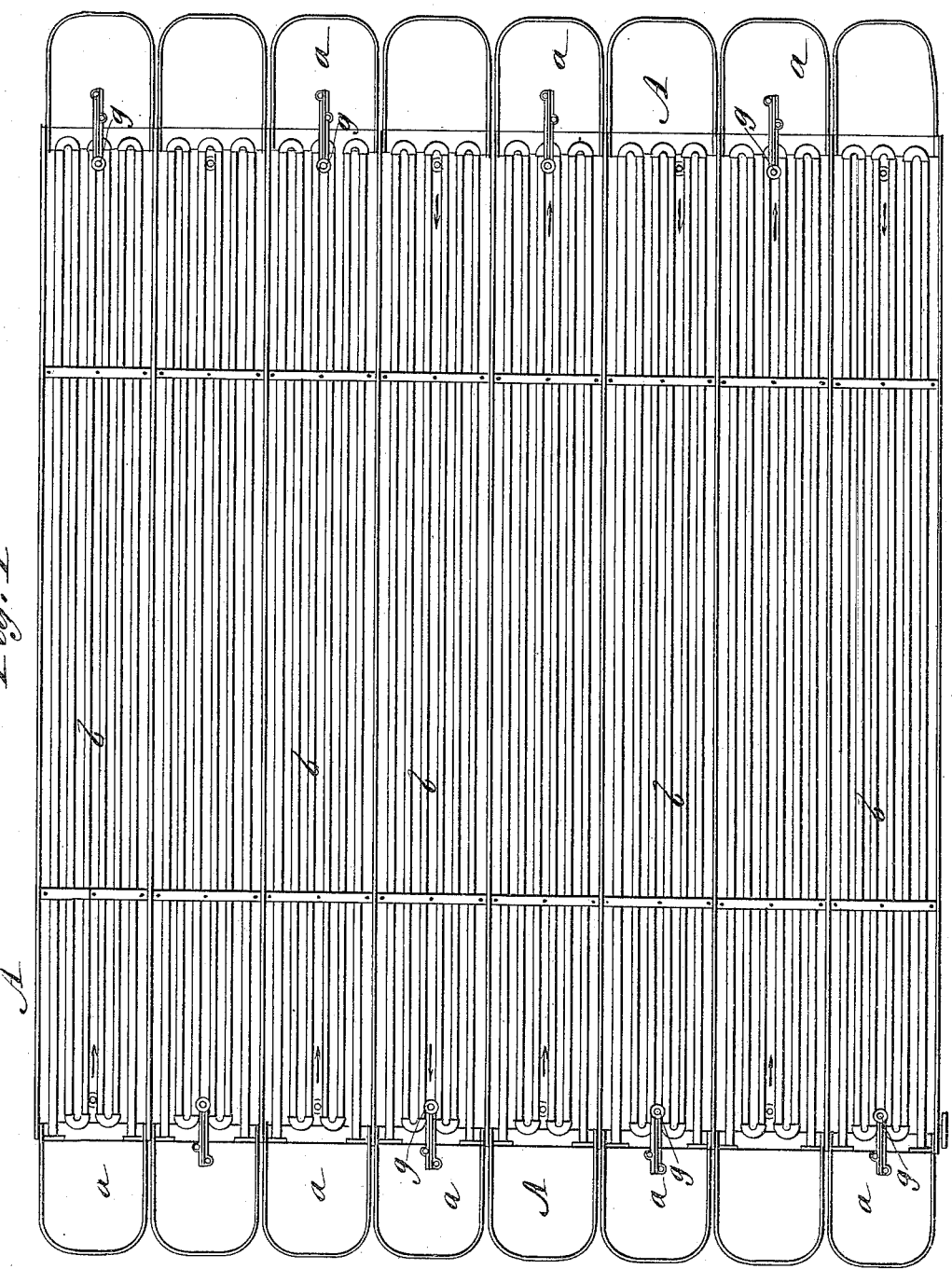

UNITED STATES PATENT OFFICE.

JOSE GUARDIOLA, OF CHOCOLA, GUATEMALA.

EVAPORATING APPARATUS FOR SACCHARINE AND OTHER JUICES.

SPECIFICATION forming part of Letters Patent No. 341,843, dated May 11, 1886.

Application filed April 24, 1884. Renewed April 15, 1886. Serial No. 199,021. (No model.)

*To all whom it may concern:*

Be it known that I, JOSE GUARDIOLA, of Chocola, Guatemala, have invented a new and Improved Evaporating Apparatus for Saccharine and other Juices, of which the following is a full, clear, and exact description.

My improvements relate to evaporators for cane or other saccharine juices; and the invention consists in certain improvements in that class of evaporators in which are employed a series of tanks or juice-vessels provided with steam-pipes and connected together by juice-pipes, so that the material can be passed from one tank to the other in the process of evaporation, as hereinafter more particularly specified and claimed.

Reference is to be had to the accompanying drawings, forming part of this specification, in which similar letters of reference indicate corresponding parts in all the figures.

Figure 1 is a general plan view of an evaporator of my improved construction. Fig. 2 is a vertical longitudinal section, and Fig. 3 a transverse section of the same. Fig. 4 is a detail view.

A A are the tanks or juice-vessels, set slightly inclined in opposite directions alternately. They are of long and narrow form, having raised ends $a$ for gathering the scum raised in the process of evaporation, and each tank having in its lower portion a coil of steam-pipes, $b$, connecting with a general steam-supply pipe, $c$, and general discharge-pipe $d$, that connects to a steam-trap or a condenser.

The connection to the steam-pipes of each vessel is valved at $c'$, so that the heat of each can be separately regulated, and each vessel thus forms an independent steam-evaporator.

In order to unite the series and form a continuous evaporator, the separate tanks A are connected by juice-pipes $e$ at their ends, so that the tanks and the connecting-pipes $e$ form a continuous channel for the flow of the juice.

The outlet-pipe $e$ of each tank is provided with a disk-valve, $f$, (see Fig. 4,) operated by a screw-rod, $g$, so that the flow of the juice can be regulated and the desired level maintained, or the flow cut off entirely when it is desired to reduce the number of vessels in use and the capacity of the apparatus, or to work the contents of either pan separately. In these cases connection to the vacuum-pan or other striking apparatus is to be made by uncoupling the outlet-pipe of the last pan and attaching it to a discharge-pipe; or the screw-plug $h$ in the bend of the pipe $e$ of that pan may be taken out and the juice drawn off at that point. The plug $h$ also allows for cleaning the pipes.

The tanks may be arranged in an upper and a lower series, with a filter between to render the juice cleaner.

This evaporator will act rapidly and effectively from the fact that the juice is divided into several portions, instead of being in a large quantity with a comparatively small heating-surface. This effects not only a great saving in steam, but the heat can be applied to any degree in either of the pans. The operation being rapid, the juice will not ferment, so that there will be no loss of sugar from that cause.

It will be readily seen that the tanks, being of comparatively small size, can be easily transported and set up in any number, according to the capacity wanted.

Having thus described my invention, what I claim as new, and desire to secure by Letters Patent, is—

In an evaporating apparatus, a series of tanks, A, having raised ends $a$, steam-coils $b$ between said ends, curved pipes $e$ below and connecting the tanks, as shown, disk-valves $f$, and their rods $g$, regulating the flow of juice through said pipes, substantially as set forth.

JOSE GUARDIOLA.

Witnesses:
H. F. ROESSER,
C. SEDGWICK.